Jan. 30, 1934.     C. L. DUNHAM     1,945,216
NUT LOCK
Filed Jan. 10, 1933
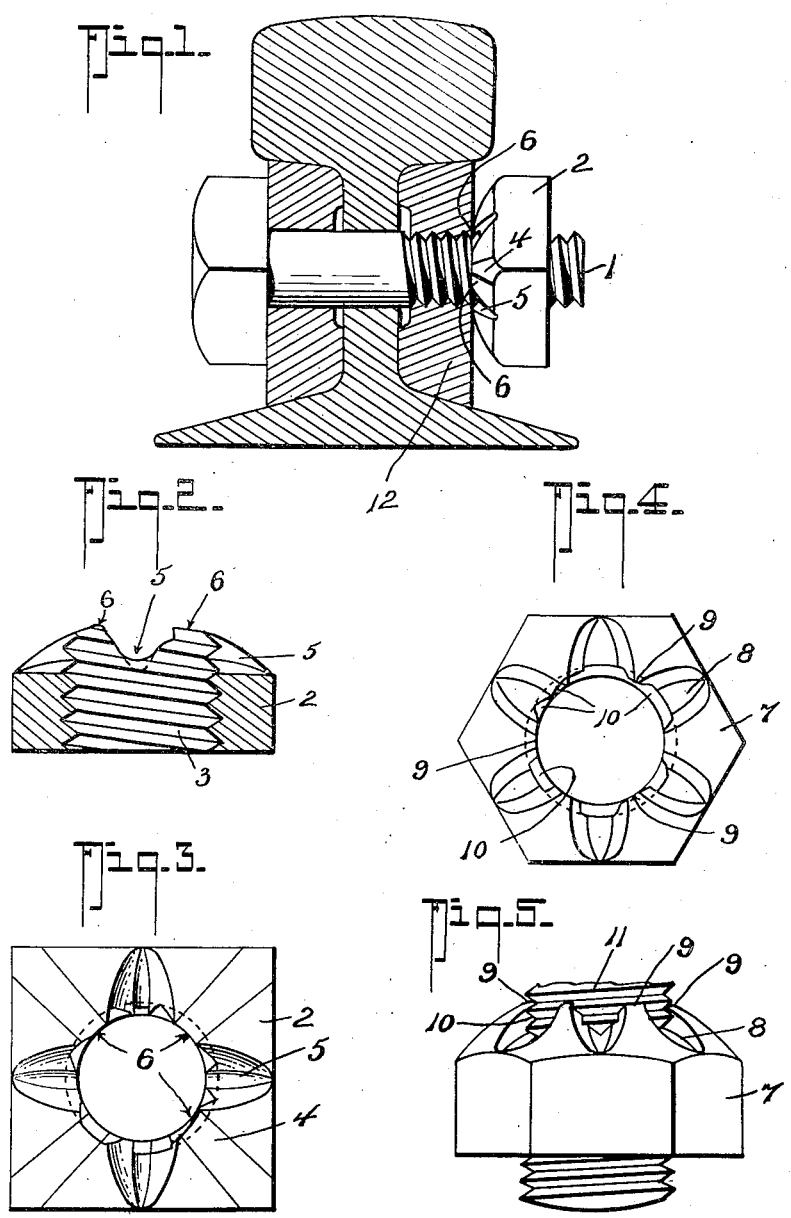
Inventor
Charles L. Dunham
By Albert R. Dieterich
Attorney Patented Jan. 30, 1934

1,945,216

UNITED STATES PATENT OFFICE 1,945,216

NUT LOCK

Charles L. Dunham, Wellsburg, W. Va., assignor of one-half to Berry Pink, New York, N. Y.

Application January 10, 1933. Serial No. 651,038

1 Claim. (Cl. 151—21)

My invention relates to certain improvements in the art of bolt and nut locks and it particularly has for its object to provide a new construction of nut in virtue of which invention the nut when once screwed home will retain its position on the bolt regardless of whether or not the bolt becomes loosened, either through elongation (due to heat expansion or otherwise) or shrinkage of the parts which are bolted together.

In other words, it is an object of my invention to provide a nut which, when once screwed on tight, will not work loose and can only be removed by the use of a wrench.

Further, it is an object to provide a nut that may be used without interposing a washer between the nut and the part to be secured against which the nut lies, when such part is made of a material approximately as hard as that of which the nut is made.

More specifically, the invention has for its object to provide a self-securing nut having provisions whereby its threads, at the end that engages the part to be fastened, are curled over, upset or mashed into tight biting and frictional gripping engagement with the threads of the bolt and by such action make it hug the bolt so tightly that no amount of jar or vibration met with in practice will loosen the nut on the bolt so it will work off (a condition common where ordinary lock washers are used with common nuts, and more or less common with special type nuts now on the market unless they be cotter-pinned in place.)

Other objects of my invention will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claim, reference being had to the accompanying drawing, in which:—

Figure 1 shows one use for my invention (on rail joints).

Figure 2 is an enlarged cross section of the nut (square type) shown in Figures 1 and 3.

Figure 3 is a face view of the nut shown in Figure 2.

Figure 4 is a face view of the nut shown in Figure 5.

Figure 5 is an elevation of the nut shown in Figure 4 with a portion of a bolt in place, showing how the nut threads are jammed to the bolt threads.

In the drawing in which like numerals of reference indicate like parts in all figures, 1 is the bolt of ordinary construction and 2 the nut which embodies my invention.

In preparing a nut to contain my invention the blank is crowned or convexed on one face, and threaded as at 3 in the usual way. The crowned face is then provided with flat faces 4 radiating to the corners and deep grooves 5 intermediate thereto. This leaves thin, chisel-like thread portion 6—6 which when the nut is screwed home will engage the part 12 to be secured and will be curled inwardly, upset, bent in or mashed so as to effect a tight frictional grip on the bolt.

Actual tests have shown that when the nut has once been screwed home tightly by the use of a wrench it cannot be jarred loose even though the bolt becomes slightly elongated in use so as to relieve the tight engagement between the nut and the part 12. Only by using a wrench can the nut be unscrewed from the bolt after the nut has been once "set" to the bolt by screwing it home tightly.

In Figures 4 and 5 I have shown my invention as applied to a hexagonal nut. In these figures 7 is the nut whose crowned or convexed face is provided with radially disposed grooves 8 along the minor diameters of the nut, thereby providing the outermost group of threads 10 with thinned metal and producing the chisel-like gripping fingers, 9—9, which will be upset, curled inwardly, or mashed against the threads of the bolt 11 when the nut is once screwed home.

I am aware that a nut of a somewhat similar appearance has heretofore been proposed, but that nut depends for its effectiveness on warping or distorting the bolt on its axis and not on the upsetting of the end threads of the nut into tight frictional engagement with the threads of the bolt.

From the foregoing description, taken in connection with the accompanying drawing, it is thought that the construction, operation and advantages of my invention will clearly appear to those skilled in the art.

What I claim is:

In combination with a bolt having threads, a nut having one face convexed or crowned, said nut being threaded to fit the bolt, and having transverse grooves radiating from its hole to leave a plurality of separated thin thread portions which will bend in or become upset into tight frictional engagement with the threads of the bolt when the nut is screwed home, said grooves being of a depth to take in at least two threads and of a width at the hole to leave narrow chisel-like portions.

CHARLES L. DUNHAM.